US009773357B2

(12) United States Patent
Fazeli et al.

(10) Patent No.: US 9,773,357 B2
(45) Date of Patent: Sep. 26, 2017

(54) AIRCRAFT LANDING GEAR SHOCK STRUT PERFORMANCE MONITORING

(71) Applicant: GOODRICH CORPORATION, Charlotte, NC (US)

(72) Inventors: Amir Fazeli, Milton (CA); Adnan Cepic, Mississaugua (CA); Susanne Reber, Middleburg Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 62 days.

(21) Appl. No.: 14/456,632

(22) Filed: Aug. 11, 2014

(65) Prior Publication Data

US 2015/0269794 A1    Sep. 24, 2015

Related U.S. Application Data

(60) Provisional application No. 61/968,472, filed on Mar. 21, 2014.

(51) Int. Cl.
| | | |
|---|---|---|
| *G06F 11/30* | (2006.01) | |
| *G07C 5/08* | (2006.01) | |
| *B64C 25/60* | (2006.01) | |
| *G01M 17/04* | (2006.01) | |

(52) U.S. Cl.
CPC ............ *G07C 5/0808* (2013.01); *B64C 25/60* (2013.01); *G01M 17/04* (2013.01)

(58) Field of Classification Search
CPC ........ G07C 5/0808; B64F 5/60; G01M 17/04; B64C 25/60
USPC ........................................................ 701/34.4
See application file for complete search history.

(56) References Cited

U.S. PATENT DOCUMENTS

| | | | |
|---|---|---|---|
| 5,148,896 A | 9/1992 | Ralph | |
| 6,058,694 A * | 5/2000 | Ackerman | F16N 29/02 184/6.11 |
| 6,886,648 B1 * | 5/2005 | Hata | B60K 6/387 180/65.235 |
| 7,274,310 B1 | 9/2007 | Nance | |
| 2011/0231037 A1 * | 9/2011 | Stiharu | B64C 25/00 701/16 |
| 2012/0253591 A1 | 10/2012 | Nance | |
| 2014/0046533 A1 * | 2/2014 | Nance | B64F 5/0045 701/33.7 |

OTHER PUBLICATIONS

Extended European Search Report dated Aug. 4, 2015 in European Application No. 15159503.0.

* cited by examiner

*Primary Examiner* — Redhwan K Mawari
*Assistant Examiner* — Rodney P King
(74) *Attorney, Agent, or Firm* — Snell & Wilmer L.L.P.

(57) ABSTRACT

A system and various methods for monitoring and evaluating the health of a shock strut assembly are illustrated. Multiple sensors, including gas temperature, gas pressure, oil pressure, and position sensor, may be used to gather data and evaluate the performance of the shock strut assembly. Various methods illustrated herein may evaluate the dynamic damping, static load support, and/or controlled stroke performance of the shock strut assembly.

20 Claims, 9 Drawing Sheets

AIRCRAFT LANDING GEAR SHOCK STRUT PERFORMANCE MONITORING

CROSS REFERENCE TO RELATED APPLICATIONS

This application claims priority to and is a non-provisional application of U.S. Provisional Patent Application Ser. No. 61/968,472 entitled "Health Monitoring Algorithm For Mixed Fluid-Gas Landing Gear Shock Struts" and filed Mar. 21, 2014, the contents of which are hereby incorporated by reference in their entirety.

FIELD

The present disclosure relates generally to shock strut assemblies and more specifically, to systems and methods for monitoring and evaluating the performance of shock strut assemblies.

BACKGROUND

Conventionally, various types of aircraft utilize shock strut assemblies to assist in reducing and managing energy transmitted from landing gear to the structure of an aircraft to which the landing gear is attached. Such shock strut assemblies often feature a piston that compresses a fluid within a sealed chamber. The fluid typically includes a gas segment and a liquid segment. Performance of the shock strut assembly may degrade over time. Such degradation can cause damage to other components of the aircraft, including bearings of the landing gear assembly.

SUMMARY

A method for monitoring the performance of a shock strut system in accordance with the present disclosure may comprise providing a shock strut mechanically coupled to a landing gear assembly and comprising a position sensor configured to measure an stroke of the shock strut and an oil chamber pressure sensor configured to measure an oil pressure within the shock strut, measuring the oil pressure during a take-off phase, and measuring the stroke during the take-off phase. Methods may further comprise evaluating a minimum recorded oil pressure and comparing the minimum recorded oil pressure to a threshold pressure, and/or evaluating an impact speed of the shock strut and comparing the impact speed to a threshold impact speed. Methods may further comprise evaluating an average stroke rate of the shock strut and comparing the average stroke rate with a threshold stroke rate.

Another method for monitoring the performance of a shock strut system in accordance with the present disclosure may comprise providing a shock strut mechanically coupled to a landing gear assembly and comprising a position sensor configured to measure an stroke of the shock strut and an oil chamber pressure sensor configured to measure an oil pressure within the shock strut, measuring a gas pressure and a gas temperature before a landing, measuring the gas pressure, the gas temperature, and an stroke after landing, evaluating an amount of gas dissolved in an oil; evaluating a static stroke of the shock strut, and comparing the static stroke of the shock strut at minimum operating temperature and maximum load on gear with a maximum stroke. Methods may further comprise evaluating an amount of energy input to the shock strut, evaluating a maximum transient load applied to an aircraft by the shock strut, and/or evaluating a shock strut efficiency. Methods may also comprise comparing one of the maximum transient load, a maximum transient stroke, and the shock strut efficiency with one of a predetermined maximum transient load, a predetermined maximum transient stroke, and a predetermined shock strut efficiency. Methods may further comprise measuring the oil pressure during a take-off phase, measuring the stroke during the take-off phase, evaluating a minimum recorded oil pressure and comparing the minimum recorded oil pressure to a threshold pressure, evaluating an impact speed of the shock strut and comparing the impact speed to a threshold impact speed, and evaluating an average stroke rate of the shock strut and comparing the average stroke rate with a threshold stroke rate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Aircraft landing gear systems in accordance with the present disclosure may comprise a shock strut. Performance of the shock strut may be evaluated by monitoring aspects of the shock strut, including gas temperature, gas pressure, oil pressure, and stroke of the shock strut at various points during operation of the aircraft.

Figure 1:
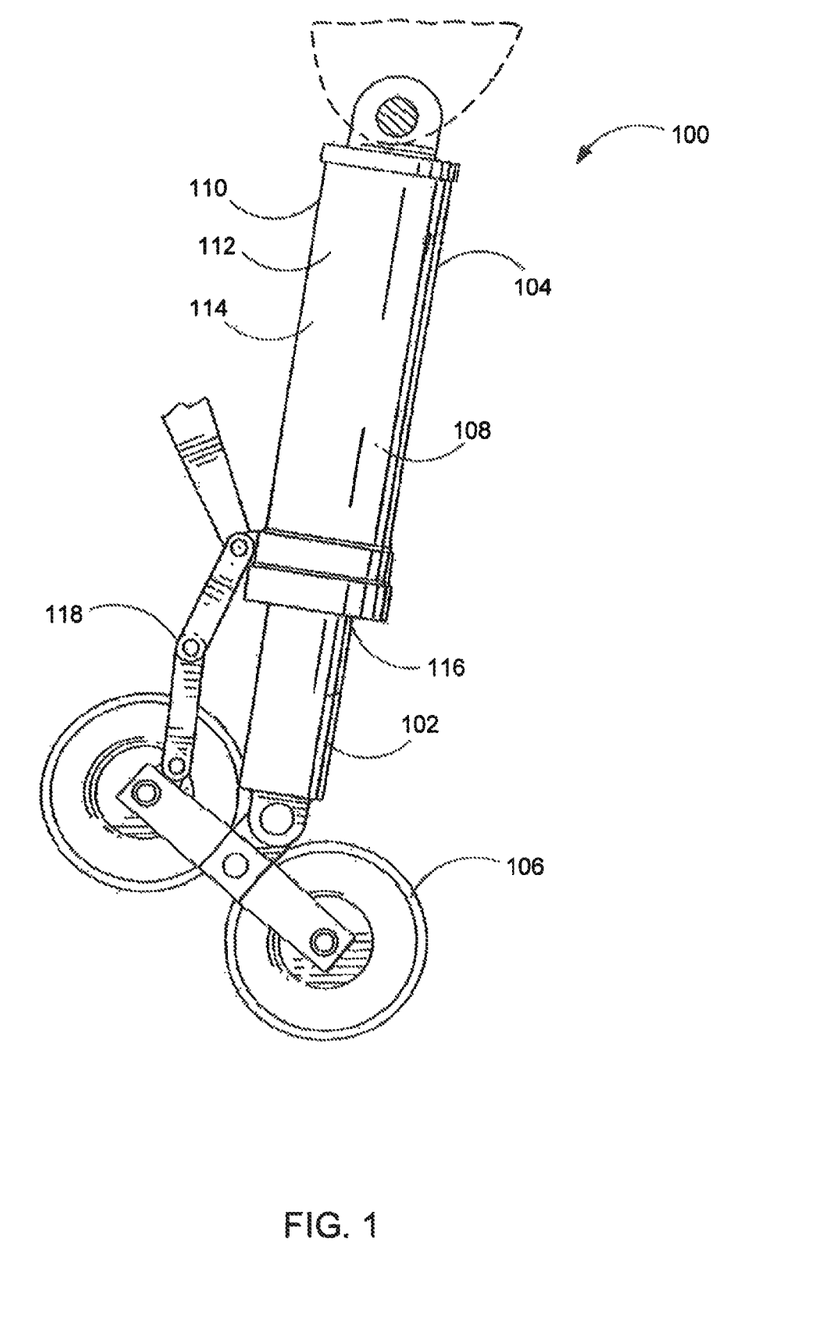
FIG. 1 illustrates, a side view of a shock strut assembly in accordance with various embodiments.

Accordingly, with reference to FIG. 1, a landing gear assembly 100 is illustrated. In various embodiments, landing gear assembly 100 comprises a shock strut 104. Shock strut 104 may be mechanically coupled to a wheel assembly 106. In various embodiments, shock strut 104 may be configured to absorb and dampen forces transmitted by wheel assembly 106 to an aircraft.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106.

In various embodiments, a liquid, such as hydraulic fluid or oil, is located within cylinder 108. Cylinder 108 and piston 102 may, for example, be configured to seal such that liquid contained within cylinder 108 is unable to leak as piston 102 moves relative to cylinder 108. Further, cylinder 108 may be configured to contain a gas. The air may be positioned above the gas (referred to as an "air-over-oil" arrangement) or vice versa. Similarly, cylinder 108 and piston 102 may be sealed such that gas is unable to leak as piston 102 moves relative to cylinder 108. As such, shock strut 104 may comprise a pressurized environment within cylinder 108.

Shock strut 104 may further comprise, for example, a gas pressure sensor 110. In various embodiments, gas pressure sensor 110 may be capable of measuring the pressure of the gas within shock strut 104 at a desired time. For example, gas pressure sensor 110 may measure the gas pressure within shock strut 104 before, during, or after take-off, or at any point during the duty cycle of shock strut 104.

In various embodiments, shock strut 104 may further comprise, for example, a gas temperature sensor 112. Gas temperature sensor 112 may be capable of measuring the temperature of the gas within shock strut 104 at any point during the duty cycle of shock strut 104.

Similarly, shock strut 104 may comprise an oil pressure sensor 114. In various embodiments, oil pressure sensor 114 may be capable of measuring the pressure of the oil within shock strut 104 at a desired time. For example, oil pressure sensor 114 may measure the oil pressure within shock strut 104 at any point during the duty cycle of shock strut 104.

Shock strut 104 may also comprise a position sensor 116. In various embodiments, position sensor 116 may be capable of measuring the position of piston 102 relative to cylinder 108, which is conventionally referred to as the stroke or stroke, of shock strut 104 at a desired time. Position sensor 116 may be configured to measure the position indirectly, for example, by measuring the orientation of one or more shock strut torque links 118 (or other components). For example, position sensor 116 may measure the stroke of shock strut 104 at any point during the duty cycle of shock strut 104.

Figure 2A:
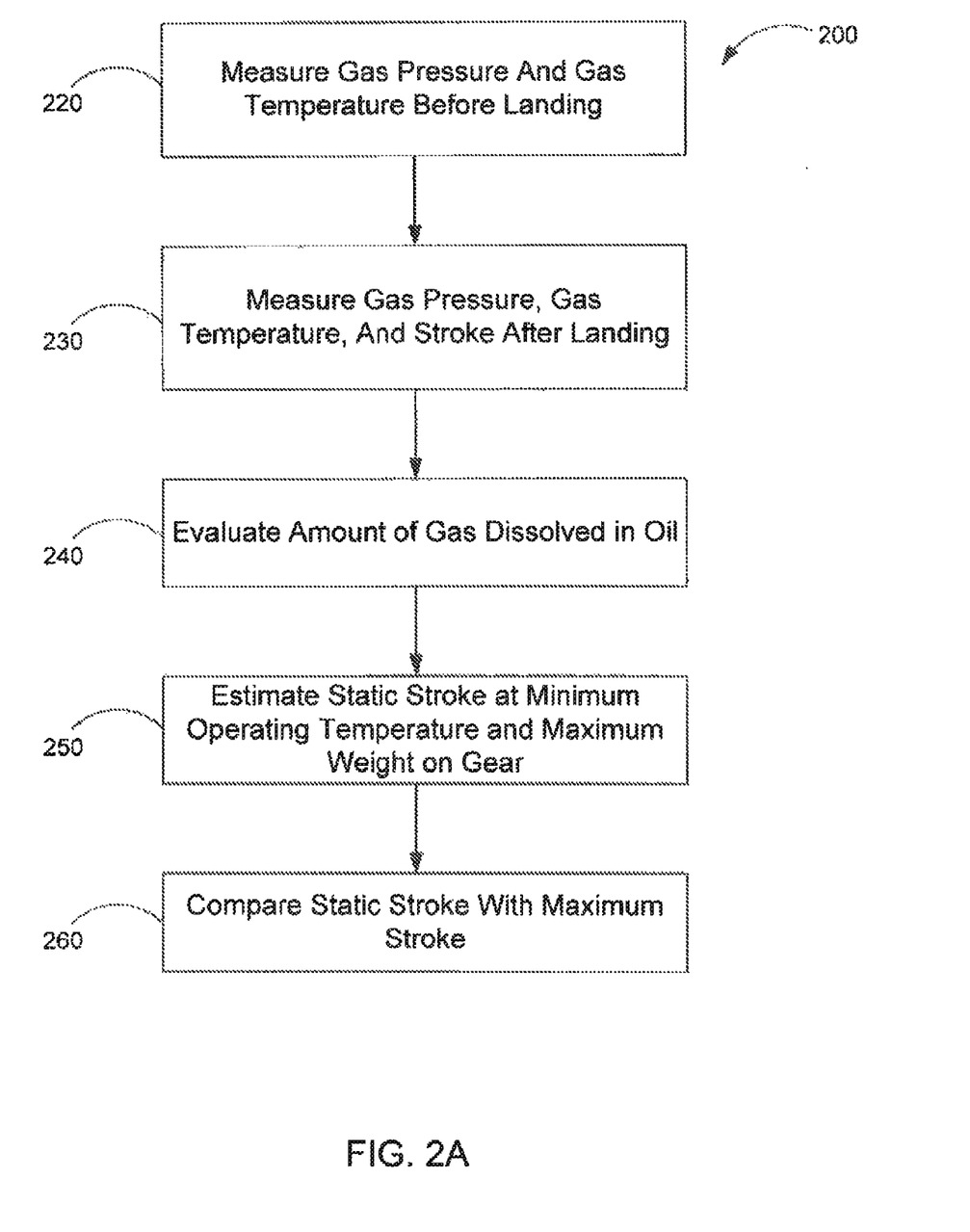
FIGS. 2A and 2B illustrate, respectively, a method of evaluating the performance of a shock strut and a graphic illustration of static and modified static airspring curves for a shock strut in accordance with various embodiments.

With reference to FIG. 2, a method 200 for evaluating the performance of a shock strut assembly is illustrated. Method 200 may, for example, comprise utilizing data from a normal landing event to predict if a shock strut (such as shock strut 104) will bottom out at a maximum static weight on a landing gear at a minimum ambient temperature. It may be possible to determine if shock strut 104 will bottom out by calculating an amount of gas dissolved in the oil of shock strut 104 and using it to determine the static stroke of shock strut 104.

In various embodiments, method 200 may comprise a step 220 of measuring gas pressure and gas temperature within a shock strut before landing. For example, step 220 may comprise measuring gas pressure data before landing from, for example, a gas pressure sensor 110. Further, step 220 may comprise measuring gas temperature data before landing from, for example, a gas temperature sensor 112.

Method 200 may further comprise a step 230 of measuring gas pressure, gas temperature, and stroke of a shock strut (such as shock strut 104) after landing. For example, step 230 may comprise measuring gas pressure data after landing from, for example, a gas pressure sensor 110. Further, step 230 may comprise measuring gas temperature data after landing from, for example, a gas temperature sensor 112. Further, step 230 may comprise measuring shock strut stroke data after landing from, for example, a position sensor 116. As will be discussed below, these data may be used to evaluate the static load support capabilities of shock strut 104.

Figure 2B:
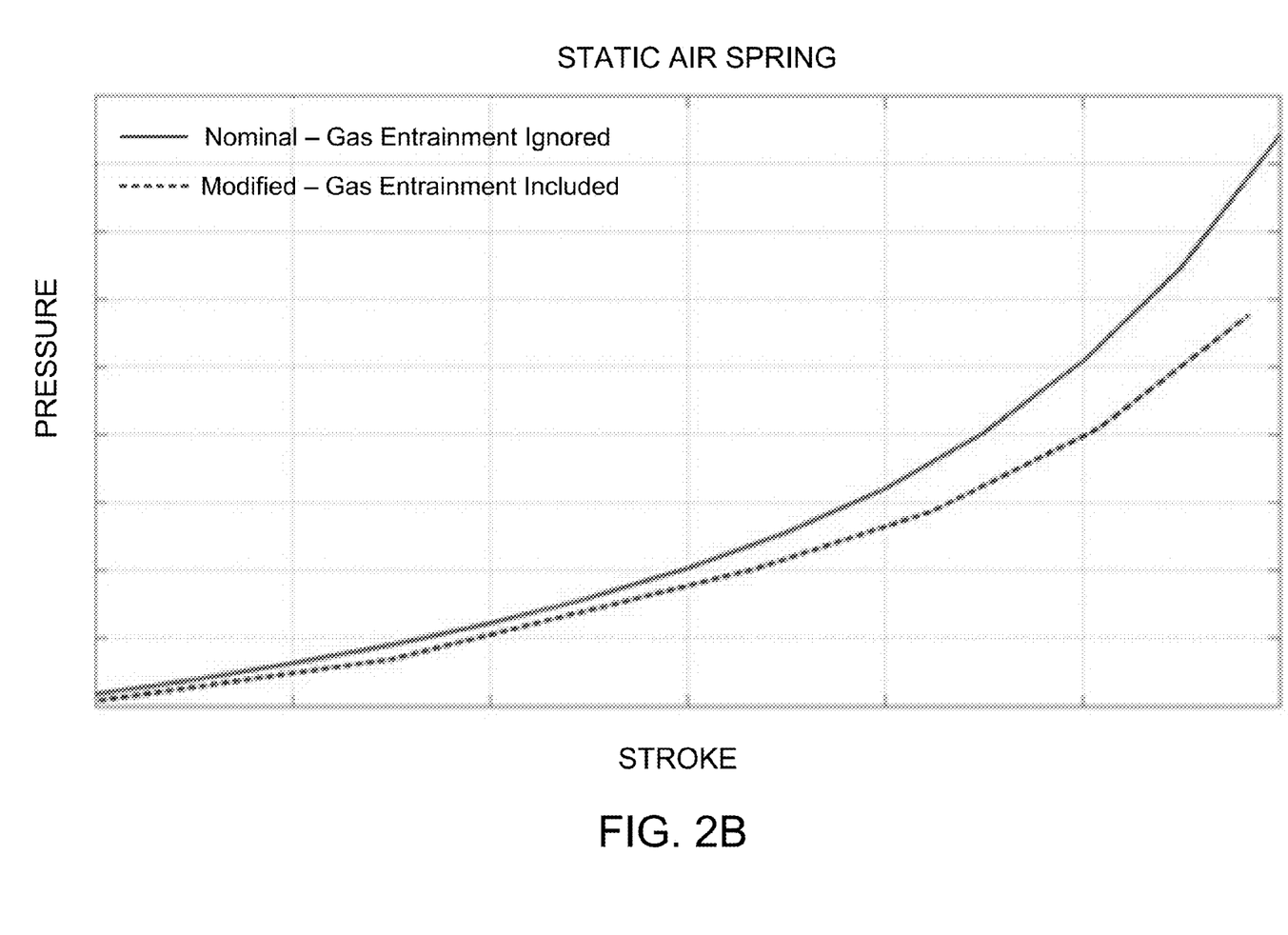

Based on Henry's law, at a given temperature, the capacity of a liquid to dissolve gas increases with gas pressure. Thus, during landing, an increased amount of gas is dissolved in the oil of shock strut 104 as the gas pressure increases. As a result, once steady state condition is achieved, the stroke of shock strut 104 will be longer than what is indicated by a static airspring curve, which is derived by neglecting effects of gas entrainment at the measured gas pressure. Stated another way, estimating a static stroke at a particular gas pressure based on a static airspring curve is insufficient to accurately predict the steady state stroke of shock strut 104 after landing because it does not account for the increased amount of gas dissolved in the liquid of shock strut 104. For example, FIG. 2B illustrates an airspring curve which takes into account such increased gas entrainment during landing, referred to as a modified static airspring curve. In various embodiments, modified static airspring curves are derived experimentally or theoretically. With reference to FIG. 2B, each point on the modified static airspring curve represents the gas steady state pressure subsequent to a landing. As such, at a particular point, the difference between the stroke represented by the static airspring curve and the stroke represented by the modified static airspring curves at a specific pressure (e.g., a load on gear) indicates the amount of gas that is dissolved in oil at that pressure.

In various embodiments, method 200 further comprises a step 240 of evaluating an amount of gas dissolved in an oil within a shock strut. For example, step 240 may comprise calculating the moles of gas dissolved in the oil within shock strut 104 using the equation below and FIG. 2B:

$$n_{gas,dissolved@P} = \frac{P \times A_p(s_{modified\ static\ curve} - s_{static\ curve})}{R \times 298},$$

where P is the oil pressure after landing, $A_p$ is external area of piston 102, R is the ideal gas constant, $s_{modified\ static\ curve}$ is the stroke of the shock strut at P, and $s_{static\ curve}$ is the stroke of shock strut 104 at P (determined from static airspring curves, such as those illustrated in FIG. 2B).

Method 200 may further comprise a step 250 of estimating a static stroke at a minimum operating temperature and a maximum weight on gear. For example, if the steady state gas pressure, gas temperature and shock strut stroke are measured once right before landing (as in step 240), and upon achieving steady after a landing (for instance, when the aircraft comes to a complete stop), the static stroke of a shock strut at the maximum weight on a landing gear assembly and a minimum operating temperature may be predicted. For example, step 250 may comprise calculating the static stroke of shock strut 104 at minimum operating temperature and maximum weight on wheel based on the data collected during a landing event and utilizing the following equations:

$$P_{gas,1} \times (V_0 - A_p s_1 - V_{oil}) = (n_{FE} - n_{gas\ dissolved@P_{gas,1}}) \times R \times T_{gas,1}$$

$$P_{gas,max\ static} \times (V_0 - A_p s_{static} - V_{oil}) = (n_{FE} - n_{gas,dissolved@P_{gas,max\ static}}) \times R \times T_{min}$$

$$P_{gas,FE} \times (V_0 - V_{oil}) = n_{FE} \times R \times T_{FE}$$

In the above set of equations $n_{(gas,dissolved)}$ is the number of moles of gas dissolved in oil. In addition oil volume ($V_{oil}$), shock strut stroke at the minimum operating temperature, maximum weight on gear ($s_{static}$), and the number of moles of gas in fully extended position ($n_{FE}$) are unknowns and are solved for.

In various embodiments, method 200 further comprises step 260 of comparing a static stroke with a predetermined maximum stroke. For example, step 260 may comprise comparing the static stroke calculated in step 250 with a predetermined maximum stroke to determine if the landing gear will bottom out. Specifically, if the static stroke is less than the predetermined maximum stroke, shock strut 104 will not bottom out, indicating desirable static load support performance by shock strut 104.

Figure 3A:
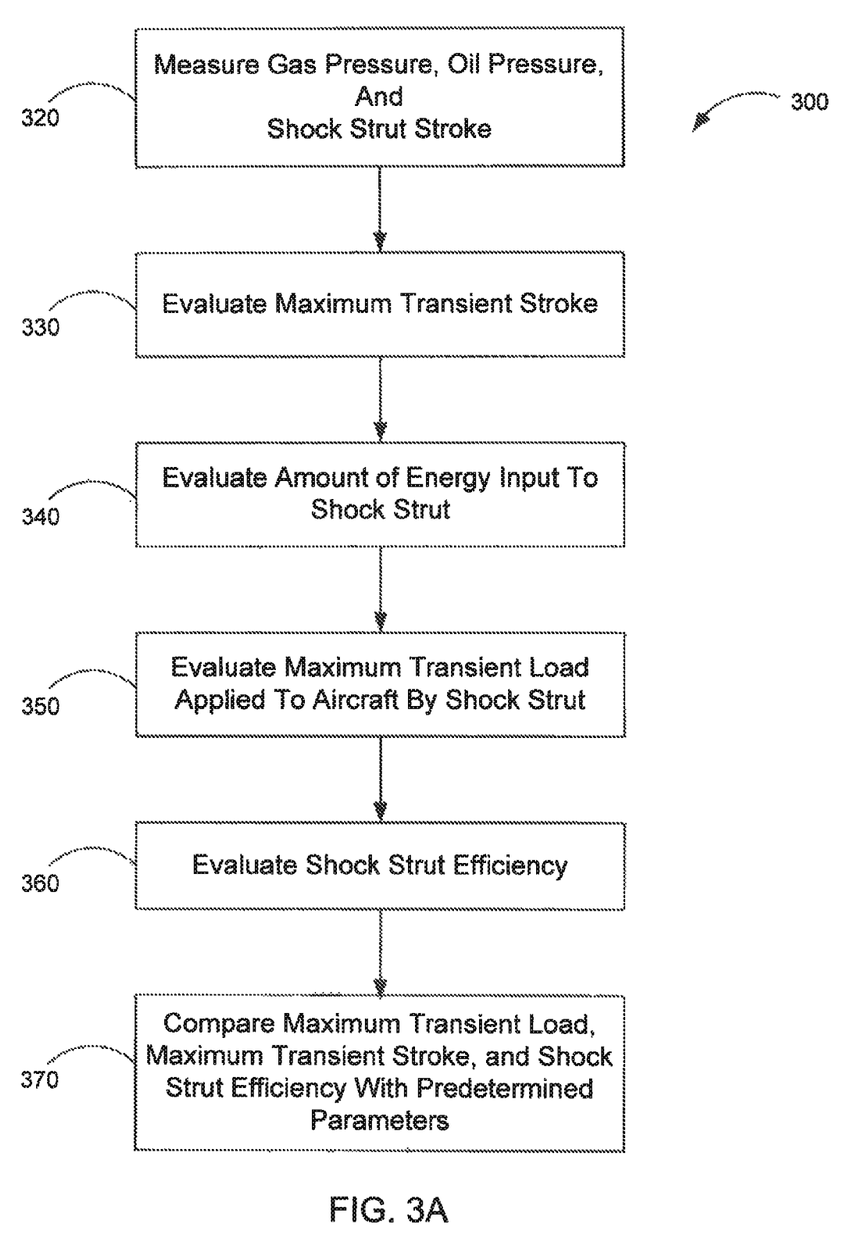
FIGS. 3A-3C illustrate, respectively, a method of evaluating the performance of a shock strut assembly, a graphical illustration of maximum stroke and maximum load data for various amounts of energy input to a shock strut, and a graphical illustration of maximum efficiency and minimum efficiency data for various amounts of energy input to a shock strut in accordance with various embodiments.

With reference to FIG. 3, a method 300 for evaluating the performance of a shock strut assembly is illustrated. In various embodiments, method 300 comprises calculating the energy input to a shock strut during a landing event and monitoring the maximum transient stroke, maximum load, and efficiency to ensure that these parameters do not deviate from the acceptable range for that particular energy input. Deviations of these parameters from the predetermined acceptable range indicate that the shock strut may bottom out or apply excessive load at the maximum landing weight and sink rate. As such, it may be possible to determine and/or predict if shock strut 104 will bottom out or apply excessive load at maximum landing weight and sink rate using measurements taken during a landing event. Such characteristics are often referred to as dynamic damping characteristics.

In various embodiments, method 300 may comprise a step 320 of measuring gas pressure, oil pressure, and shock strut stroke within a shock strut during landing. For example, step 320 may comprise measuring gas pressure data during landing from, for example, gas pressure sensor 110, measuring oil pressure data during landing from oil pressure sensor 114, and measuring shock strut stroke data during landing from position sensor 116. As will be discussed further, such data may be used to evaluate the dynamic damping performance and characteristics of shock strut 104.

Method 300 may further comprise a step 330 of evaluating a maximum transient stroke during landing. For example, step 330 may comprise monitoring data provided by position sensor 116 to determine the largest stroke undergone by shock strut 104 during a landing event.

In various embodiments, method 300 further comprises a step 340 of evaluating an amount of energy input to a shock strut during a landing event. For example, step 340 may comprise calculating the energy input to shock strut 104 during a landing event using the following equation:

$$W_{ss} = W_g + W_{oil} \int_0^{s_{max}} (P_{oil}(s) - P_{gas}(s)) \times (A_h - A_o) ds + \int_0^{s_{max}} P_{gas}(s) A_p ds,$$

where $W_{ss}$ is the energy input to the shock strut during landing.

Method 300 may further comprise a step 350 of evaluating a maximum transient load applied to an aircraft by a shock strut during landing. For example, step 350 may comprise calculating the maximum transient load applied by shock strut 104 to the aircraft according to the following equation:

$$F(s) = (P_{oil}(s) - P_{gas}(s)) \times (A_h - A_o) + P_{gas}(s) \times A_p,$$

where F(s) is the transient load as a function of stroke.

In various embodiments, method 300 further comprises a step 360 of evaluating a shock strut efficiency. For example, step 360 may comprise evaluating the efficiency of shock strut 104 using the following equation:

$$\eta = \frac{W_{dissipated}}{W_{dissipated} + W_{absorbed}} = \frac{\int_0^{s_{max}} (P_{oil}(s) - P_{gas}(s)) \times (A_h - A_o) ds}{\int_0^{s_{max}} (P_{oil}(s) - P_{gas}(s)) \times (A_h - A_o) ds + \int_0^{s_{max}} P_{gas}(s) A_p ds},$$

where $\eta$ is the efficiency of shock strut 104 in dissipating the energy input to shock strut 104 during landing.

Figure 3B:
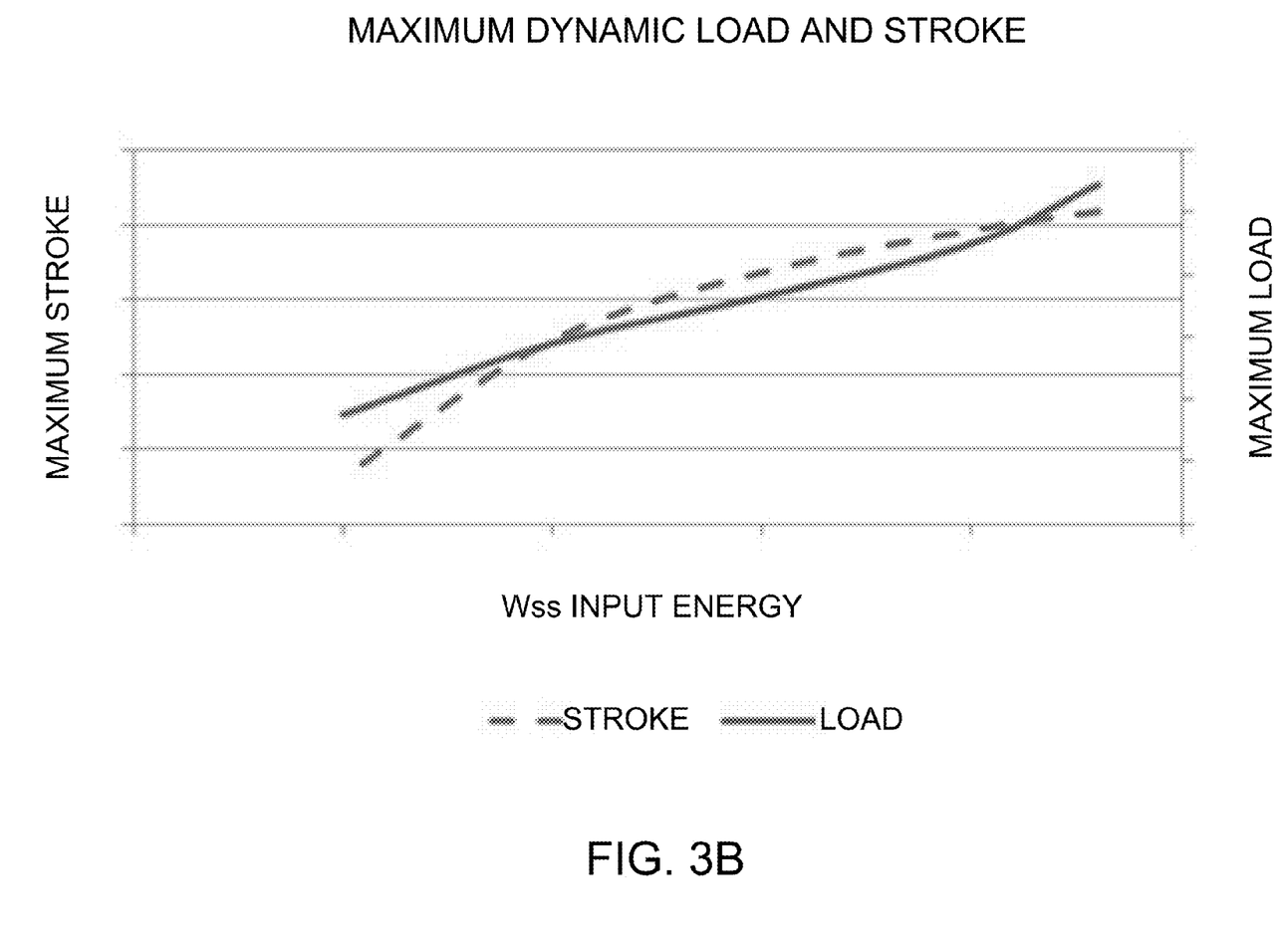

Method 300 may further comprise a step 370 of comparing the maximum transient load, maximum transient stroke, and shock strut efficiency to predetermined parameters based on the energy input to the shock strut. For example, predetermined maximum transient load, maximum transient stroke, and shock strut efficiency range may comprise values for each parameter above which the shock strut would exhibit undesirable characteristic, such as, for example, bottoming out or applying excessive load to the aircraft. These predetermined parameters may be obtained by reference to graphical illustrations of typical operating parameters. For example, with reference to FIG. 3I, maximum stroke and maximum load data for various amounts of energy input to shock strut 104 are illustrated. FIG. 3B may be used to obtain the predetermined maximum stroke and/or maximum load at a particular amount of energy input to shock strut 104.

Figure 3C:
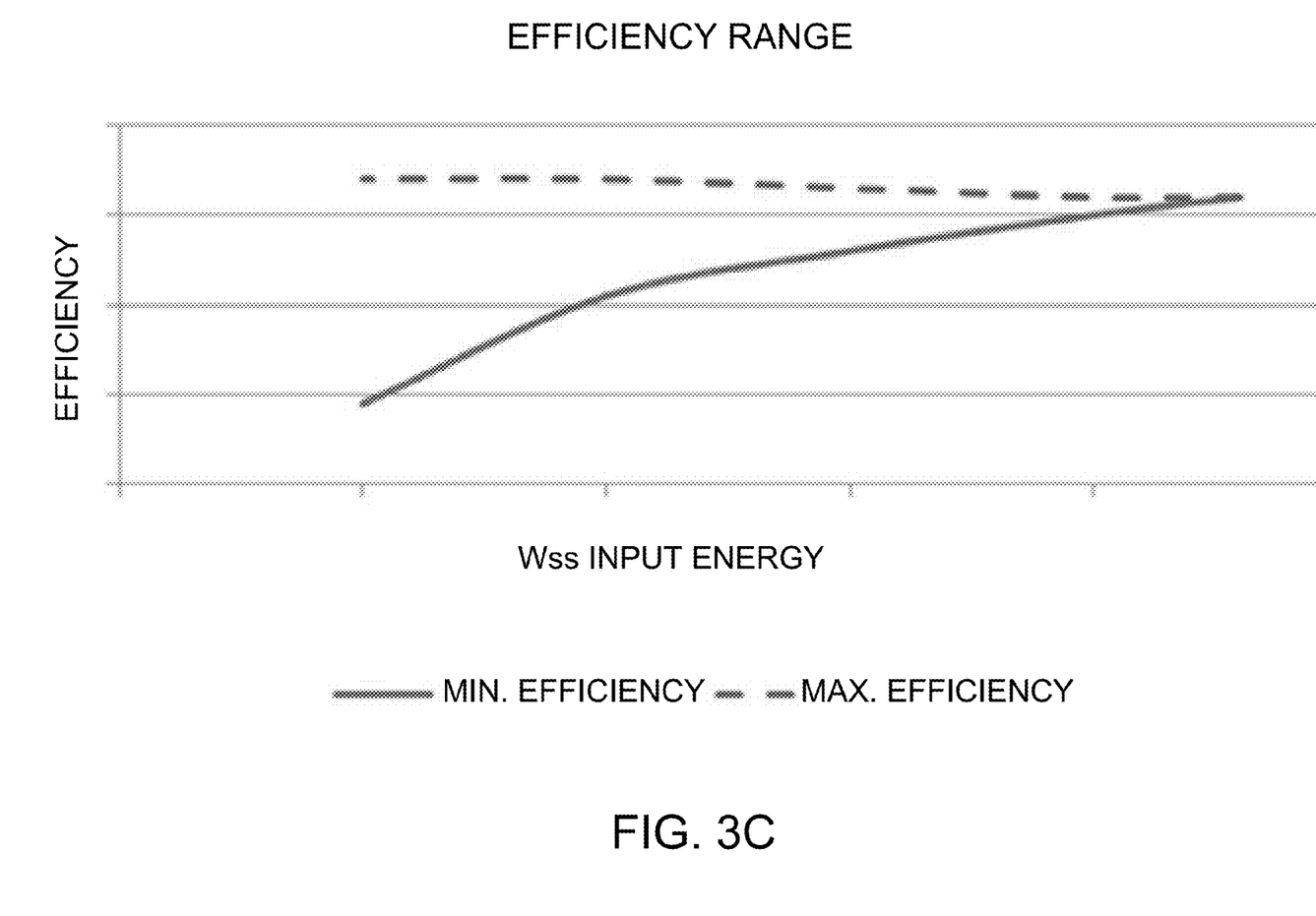

With reference to FIG. 3C, maximum efficiency and minimum efficiency data for various amounts of energy input to shock strut 104 are illustrated. FIG. 3C may be consulted to obtain the predetermined maximum efficiency and/or minimum efficiency at a particular amount of energy input to shock strut 104. Comparing the predetermined parameters, including predetermined maximum transient load, maximum transient stroke, and shock strut efficiency, to the calculated parameters during a landing may assist in determining if shock strut 104 is operating at a desired level. Specifically, if one or more of the calculated parameters is greater or less than the predetermined ranges, shock strut 104 may exhibit dynamic damping that not is within an acceptable operating range. In such conditions, shock strut 104 may need to be repaired, serviced, or replaced.

Figure 4A:
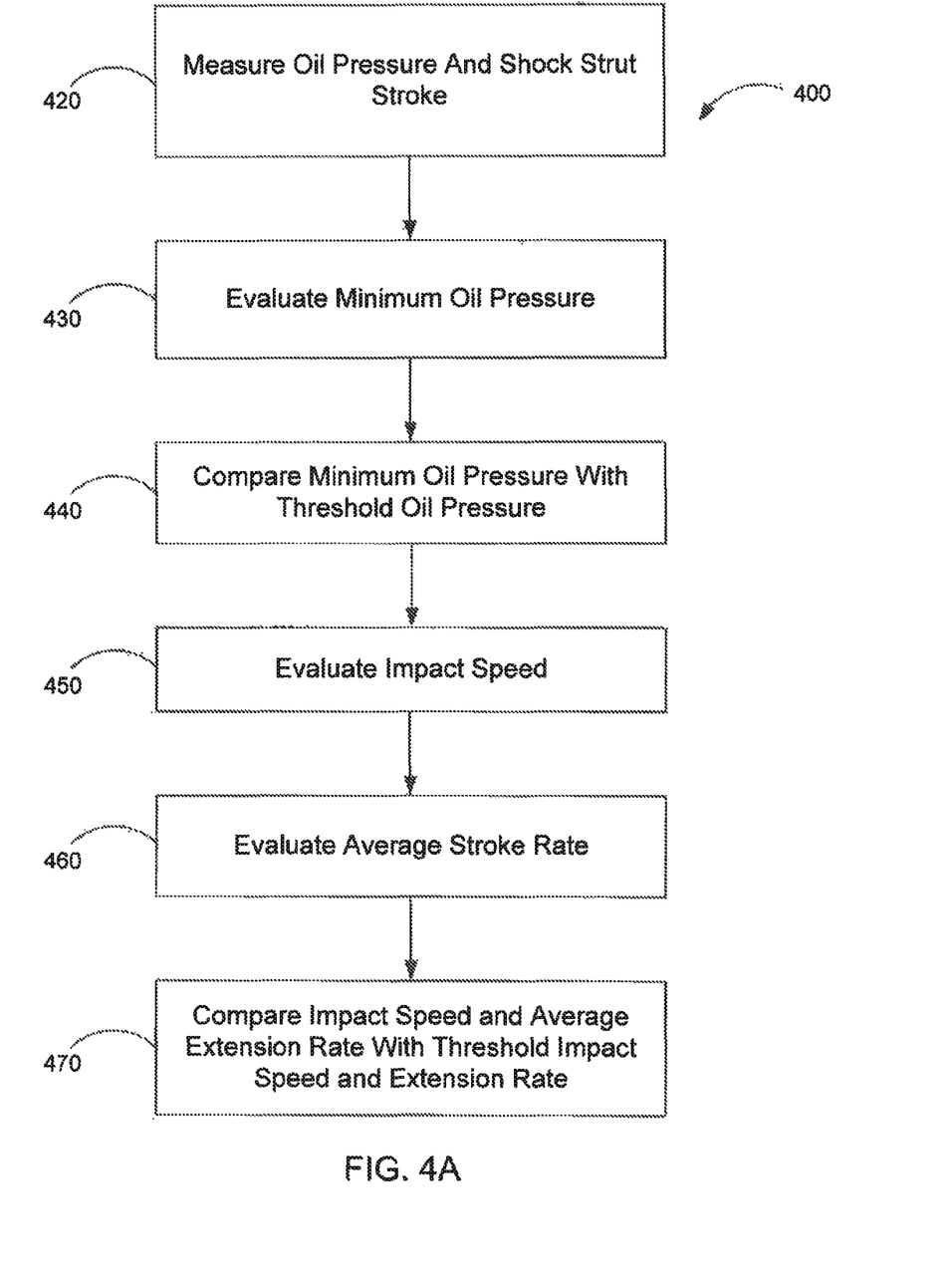
FIGS. 4A-4C illustrate, respectively, a method of evaluating the performance of a shock strut assembly, a graphical illustration of the stroke of a shock strut at various times during take-off in, and an enlarged view of a portion of the graphical illustration of FIG. 4B in accordance with various embodiments.

With reference to FIG. 4A, a method 400 for evaluating the performance of a shock strut assembly is illustrated. For example, method 400 may comprise utilizing data gathered, for example, from a regular take-off event, to determine if a shock strut (such as shock strut 104) is operating such that the stroke rates are within a predetermined range. Typically, a shock strut should extend to the fully extended position during take-off of an aircraft in a short time period to reduce the time needed for retraction of the landing gear. However, the maximum stroke rate should be bounded to limit the impact load on the lower and upper bearings of the landing gear to prevent potential damage to the bearings. Further, when the landing gear extends during take-off, oil pressure in the oil chamber of the shock strut decreases. The pressure drop in the oil chamber is directly dependent upon the stroke rate. Fast stroke rates lead to lower pressures in the oil chamber and increase the chance of cavitation. Thus, the stroke rate should be maintained within a certain range to avoid cavitation and excessive impact load on the bearings while supporting a fast retraction. In various embodiments, method 400 may be utilized to determine if shock strut 104 will extend too slowly or too rapidly by monitoring the oil pressure within shock strut 104 during take-off, evaluating the impact speed of shock strut 104, and determining the average stroke rate of shock strut 104. Through such monitoring, it may be possible to avoid damaging bearings, reducing cavitation, and preventing excessive impact load on the aircraft and/or bearings.

In various embodiments, method 400 may comprise a step 420 of measuring oil pressure and shock strut stroke within a shock strut. For example, step 420 may comprise measuring oil pressure data during take-off from, for example, an oil pressure sensor 114 and measuring shock strut stroke data during take-off from position sensor 116. In addition to during take-off, oil pressure and shock strut stroke may be measured during any phase of operation of the aircraft, including during landing and taxiing phases.

Method 400 may further comprise, for example, a step 430 of evaluating a minimum oil pressure. Step 430 may comprise monitoring the oil pressure data provided by oil pressure sensor 114 to determine the minimum oil pressure value of shock strut 104. In various embodiments, method 400 further comprises a step 440 of comparing the minimum oil pressure determined in step 430 with a predetermined threshold oil pressure. For example, if the minimum oil pressure determined in step 430 is below a predetermined threshold oil pressure, cavitation may occur within shock strut 104, reducing the performance of shock strut 104.

Figure 4B:
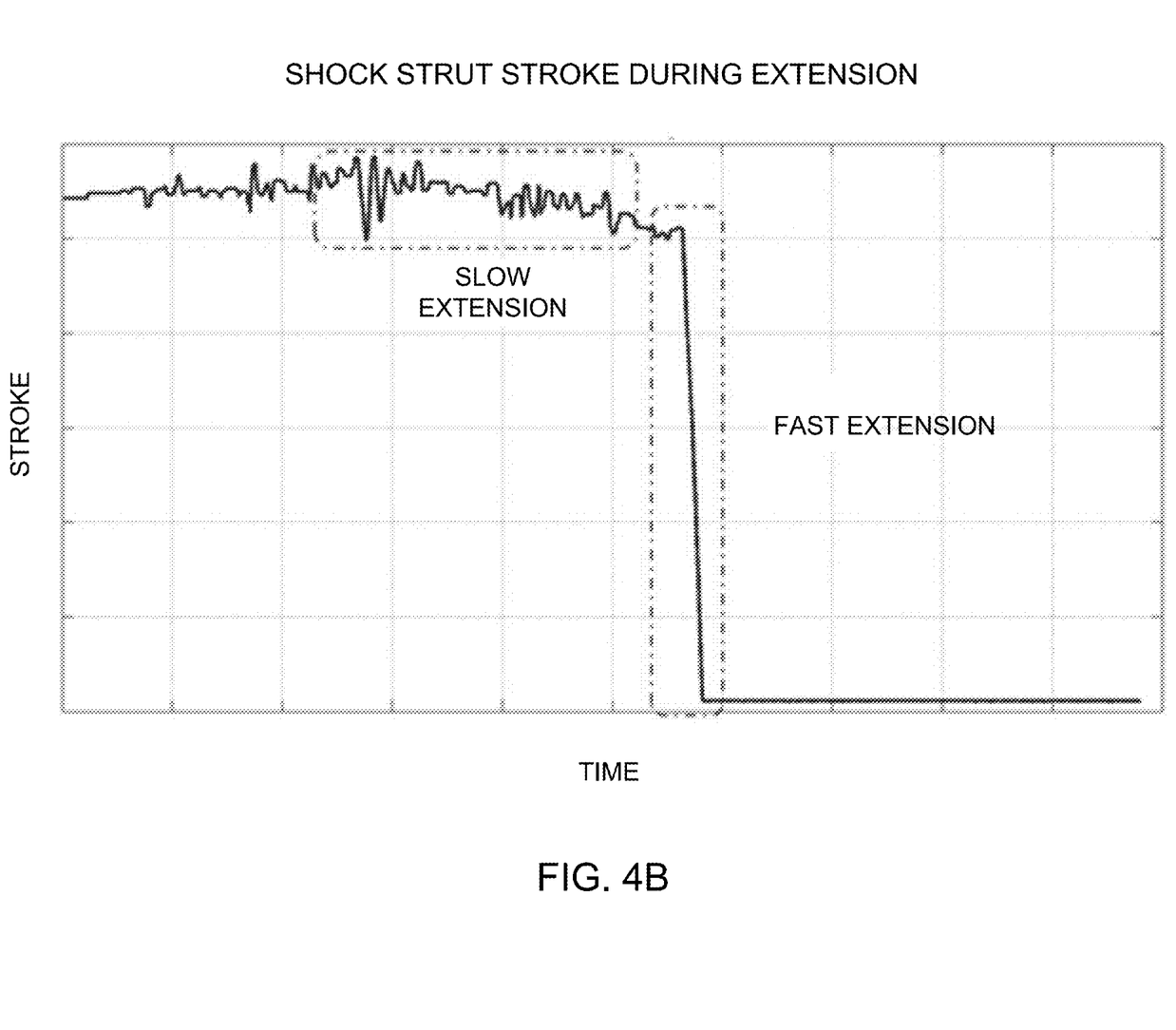
Figure 4C:
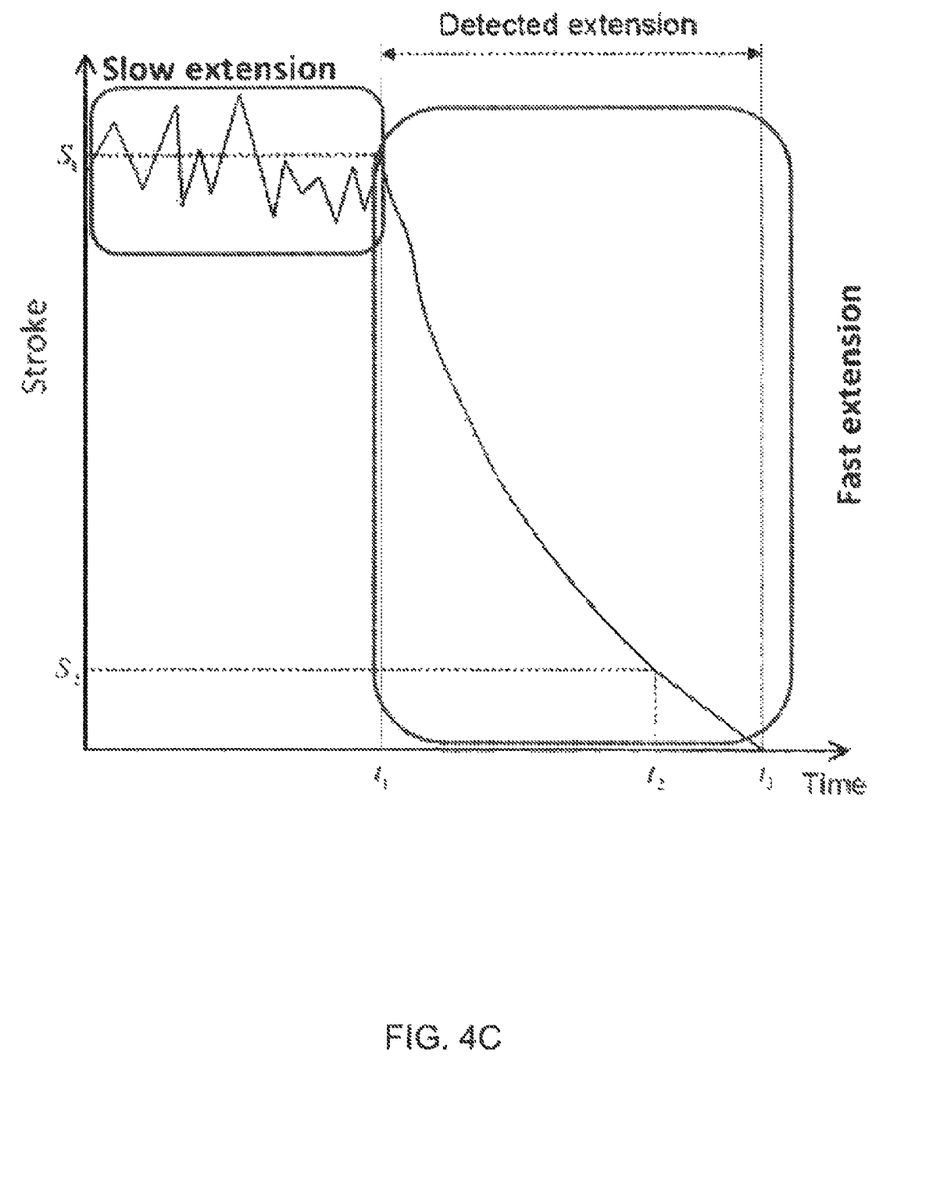

In various embodiments, method 400 further comprises a step 450 of evaluating an impact speed of shock strut 104. For example, the impact speed of shock strut 104 may be calculated (e.g., during take-off) by determining the average extension rate over the last stage of the "fast extension" phase during a take-off event, which occurs once the wheels have left the ground and shock strut 104 is free to extend without the support of the ground. With reference to FIG. 4B, the stroke of shock strut 104 at various times during take-off is illustrated. The "fast extension" phase of a take-off occurs when a rapid change in stroke of shock strut 104 occurs. With reference to FIG. 4C, the impact speed of shock strut 104 can be calculated by taking the average speed of stroke of shock strut 104 in the last stage of a "fast extension" phase, according to the following equation:

$$\dot{S}_{impact} = \frac{s_2 - 0}{t_3 - t_2}$$

where $\dot{S}_{impact}$ is the shock strut 104 bearings impact speed, and $s_2$, $t_3$, and $t_2$ are obtained from FIG. 4C, which illustrates an enlarged view of a portion of FIG. 4B.

Method 400 may further comprise, for example, a step 460 of evaluating the average extension rate of shock strut 104. With reference to FIG. 4C, the average extension rate of shock strut 104 may be calculated according to the following equation:

$$\dot{S}_{avg} = \frac{s_1 - 0}{t_3 - t_1} \geq \dot{S}_{avg,min}$$

where $\dot{S}_{avg}$ is the average stroke rate of shock strut 104, and $s_1$, $t_2$, and $t_1$ are obtained from FIG. 4C, which illustrates an enlarged view of a portion of FIG. 4B.

In various embodiments, method 400 further comprises a step 470 of comparing the impact speed and average extension rate with a threshold impact speed and a threshold extension rate. For example, the threshold impact speed may represent a maximum allowable impact speed. Further, the threshold extension rate may represent a minimum desired extension rate. If one or both of the impact speed or extension rate do not meet their respective threshold values, shock strut 104 may need repair, maintenance, or replacing.

In various embodiments, one or more of methods 200, 300, and 400 may be combined to evaluate multiple performance factors of shock strut 104. For example, all three methods may be combined to monitor the dynamic damping, static load support, and controlled extension performance of the same shock strut 104. The simultaneous use of any combination of methods 200, 300, and 400 is within the scope of the present disclosure. Further, one or more of methods 200, 300, and 400 may be utilized during any phase of operation of the aircraft, including utilizing one or more of the methods during different phases of operation.

The following nomenclature corresponds to various equations and parameters described in the present disclosure:

$A_p$: Piston external area
$A_h$: Piston internal area
$A_o$: Orifice area
$F_{gas}(s)$: Force applied by gas
$F_{oil}(s)$: Force applied by oil
$F(s)$: Transient load transmitted to aircraft
F(max static): Maximum static load on shock strut
M: Aircraft weight on gear equivalent mass
$M_{max}$: Aircraft maximum weight on gear equivalent mass
$n_{FE}$: Number of moles of gas in fully extended position
n(gas,dissolved@P): Number of moles of gas dissolved in oil at pressure 'P'
P(oil,min): Minimum allowed oil chamber pressure
P(gas,max static): Gas pressure corresponding to maximum static load
P(gas,l): Steady state gas pressure after landing
$P_{oil}(s)$: Oil pressure at stroke 's'
$P_{gas}(s)$: Gas pressure at stroke 's'
P(gas,FE): Gas pressure in fully extended position
R: Ideal gas constant
$s_{max}$: Maximum shock strut stroke
s(max,tr): Shock strut maximum transient stroke
s(modified static curve): Stroke on modified air-spring curve
s(static curve): Stroke on static airspring
s(1): Measured steady state stroke after landing
Δs: Stroke margin
$s_{impact}$: Bearings impact speed
$s_{(impact,max)}$: Maximum allowed impact speed
$s_{avg}$: Average extension rate
$s_{(avg,min)}$: Minimum allowed extension rate
$T_{FE}$: Gas temperature in fully extended position
$T_{min}$: Minimum operating temperature T(gas,l): Steady state gas temperature after landing
$v_{max}$: Maximum allowed descent speed
$V_{oil}$: Oil volume
$V_0$: Shock strut internal volume in fully extended position
$W_g$: Work performed on gas
$W_{oil}$: Work performed on oil
$W_{dissipated}$: Dissipated energy
$W_{absorbed}$: Absorbed energy
$W_{ss}$: Energy input to shock strut
$W_{tire}$: Energy absorbed by tire
η: Shock strut efficiency Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment. C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment." "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring the performance of a shock strut system comprising:
    providing a shock strut mechanically coupled to a landing gear assembly and comprising a position sensor configured to measure a stroke of the shock strut and an oil chamber pressure sensor configured to measure an oil pressure within the shock strut;
    measuring the oil pressure by the oil chamber pressure sensor during a take-off phase;
    measuring the stroke by the position sensor during the take-off phase;
    determining a first performance factor of the shock strut by,
        evaluating a minimum recorded oil pressure within the shock strut measured during the take-off phase and comparing the minimum recorded oil pressure to a threshold pressure to determine whether cavitation is present within the shock strut,
        determining an impact speed of the shock strut by calculating an average extension rate of the stroke during an end stage of an extension stage during the take-off phase,
        evaluating the impact speed of the shock strut during the end stage of the extension stage by comparing the impact speed to a threshold impact speed, and
        evaluating an average stroke rate of the shock strut during the extension stage of the take-off phase and comparing the average stroke rate with a threshold extension rate; and
    indicating by the first performance factor whether the shock strut is within an acceptable operating range for shock strut extension.

2. The method for monitoring the performance of a shock strut system of claim 1, further comprising measuring by a gas pressure sensor a gas pressure in the shock strut before landing and after landing, measuring by a gas temperature sensor a gas temperature in the shock strut before landing and after landing, and measuring the stroke by the position sensor after landing.

3. The method for monitoring the performance of the shock strut system of claim 2, further comprising evaluating an amount of gas dissolved in an oil of the shock strut based on the gas pressure measured after landing.

4. The method for monitoring the performance of the shock strut system of claim 3, further comprising determining a static stroke of the shock strut at minimum operating temperature and maximum load and comparing the static stroke with a maximum stroke to determine a second performance factor of the shock strut.

5. The method for monitoring the performance of a shock strut system of claim 4, wherein the second performance factor comprises a static load support capability of the shock strut.

6. The method for monitoring the performance of the shock strut system of claim 1, further comprising evaluating a maximum transient stroke.

7. The method for monitoring the performance of the shock strut system of claim 6, further comprising evaluating an amount of energy input to the shock strut.

8. The method for monitoring the performance of the shock strut system of claim 7, further comprising evaluating a maximum transient load applied to an aircraft by the shock strut.

9. The method for monitoring the performance of the shock strut system of claim 8, further comprising evaluating a shock strut efficiency.

10. The method for monitoring the performance of the shock strut system of claim 9, further comprising comparing one of the maximum transient load, the maximum transient stroke, and the shock strut efficiency with one of a predetermined maximum transient load, a predetermined maximum transient stroke, and a predetermined shock strut efficiency to determine a third performance factor of the shock strut.

11. The method for monitoring the performance of a shock strut system of claim 10, wherein the third performance factor comprises a dynamic damping performance of the shock strut.

12. A method for monitoring the performance of a shock strut system comprising:
provanding a shock strut mechanically coupled to a landing gear assembly and comprising a position sensor configured to measure a stroke of the shock strut and an oil chamber pressure sensor configured to measure an oil pressure within the shock strut;
measuring a gas pressure within the shock strut by a gas pressure sensor and a gas temperature within the shock strut by a gas temperature sensor before a landing;
measuring the gas pressure within the shock strut by the gas pressure sensor, the gas temperature within the shock strut by the gas temperature sensor, and a stroke by the position sensor after the landing;
evaluating an amount of gas dissolved in an oil within the shock strut based on the gas pressure measured after the landing;
evaluating a static stroke of the shock strut for a minimum operating temperature and a maximum load on gear, the static stroke based on the gas pressure after the landing, the stroke after the landing and the amount of gas dissolved in the oil;
comparing the static stroke of the shock strut with a maximum stroke to determine a first performance factor of the shock strut; and
providing feedback indicating by the first performance factor whether the shock strut is within an acceptable operating range for static stroke.

13. The method for monitoring the performance of the shock strut of claim 12, further comprising evaluating an amount of energy input to the shock strut.

14. The method for monitoring the performance of the shock strut of claim 13, further comprising evaluating a maximum transient load applied to an aircraft by the shock strut.

15. The method for monitoring the performance of the shock strut of claim 14, further comprising evaluating a shock strut efficiency.

16. The method for monitoring the performance of the shock strut of claim 15, further comprising comparing one of the maximum transient load, a maximum transient stroke, and the shock strut efficiency with one of a predetermined maximum transient load, a predetermined maximum transient stroke, and a predetermined shock strut efficiency to determine a second performance factor of the shock strut.

17. The method for monitoring the performance of the shock strut of claim 16, wherein the second performance factor comprises a dynamic damping performance of the shock strut.

18. The method for monitoring the performance of the shock strut of claim 12, further comprising:
measuring the oil pressure by the oil chamber pressure sensor during a take-off phase;
measuring the stroke by the position sensor during the take-off phase;
evaluating a minimum recorded oil pressure within the shock strut measured during the take-off phase and comparing the minimum recorded oil pressure to a threshold pressure;
determining an impact speed of the shock strut by calculating an average extension rate of the stroke during an end stage of an extension stage during the take-off phase;
evaluating the impact speed of the shock strut by comparing the impact speed to a threshold impact speed; and
evaluating an average stroke rate of the shock strut during the extension stage and comparing the average stroke rate with a threshold extension rate to determine an extension performance of the shock strut.

19. The method for monitoring the performance of the shock strut of claim 12, wherein the first performance factor comprises a static load support capability of the shock strut.

20. The method for monitoring the performance of a shock strut system of claim 1, wherein the first performance factor comprises an extension performance of the shock strut.

* * * * *